UNITED STATES PATENT OFFICE.

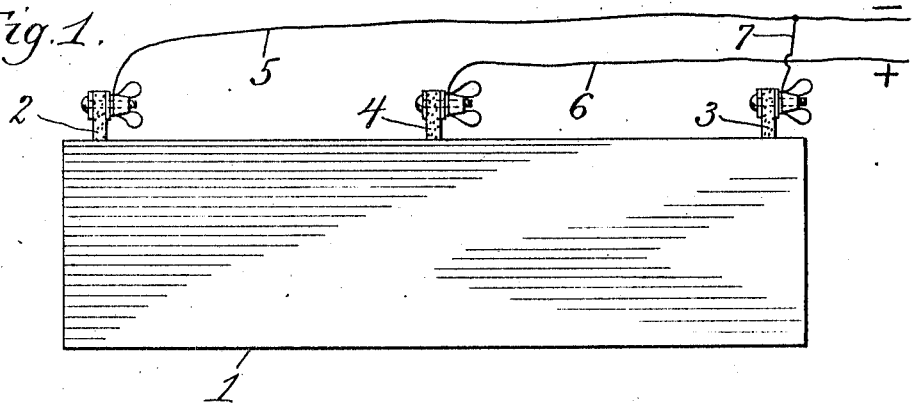
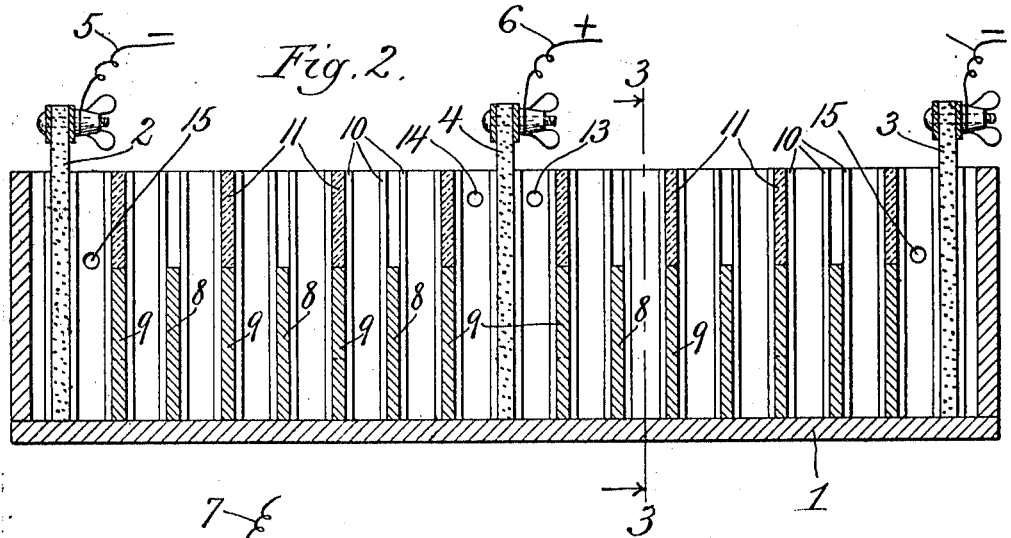
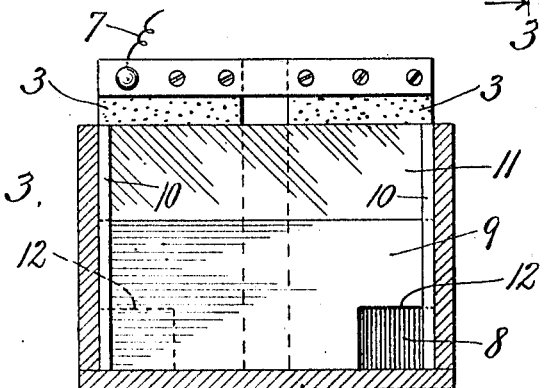

LAURA G. FIXEN, OF CHICAGO, ILLINOIS.

ELECTROLYTIC APPARATUS.

1,026,857.  Specification of Letters Patent.  Patented May 21, 1912.

Application filed June 4, 1910. Serial No. 564,949.

*To all whom it may concern:*

Be it known that I, LAURA G. FIXEN, a citizen of the United States, residing at Chicago, in the county of Cook and State of Illinois, have invented a certain new and useful Improvement in Electrolytic Apparatus, of which the following is a specification.

This invention relates to improvements in electrolytic apparatus, and has for its object to provide a new and improved apparatus of this description.

The invention is illustrated in the accompanying drawings, wherein—

Figure 1 is a side elevation of a device embodying the invention; Fig. 2 is a longitudinal sectional view of the device shown in Fig. 1; Fig. 3 is a sectional view taken on line 3—3 of Fig. 1.

Like numerals refer to like parts throughout the several figures.

In carrying out the invention I provide a tank, 1, provided at the ends with the electrodes 2 and 3, and near the middle with an electrode 4. As herein shown the electrodes 2 and 3 are negative electrodes and the electrode 4 a positive electrode. These electrodes are connected in a suitable electric circuit by the wires 5, 6 and 7. Located between the electrodes are a series of plates, 8 and 9, of carbon or the like which extend entirely across the tank, 1, and which are held in place in any desired manner, as by means of the holding pieces or cleats 10. The plates 8 and 9 are of less height than the depth of the tank, 1, and preferably extend about half way up from the bottom of said tank, as illustrated. The plates 9 have placed on top of them glass pieces, 11, which extend preferably to or near the top of the tank. The tops of these glass pieces should extend above the surface of the liquid in the tank. The plates 8 are preferably continuous across the tank so that any liquid to flow along the tank must flow over the tops thereof. The plates 9 are provided at the bottom with openings 12, through which the liquid in the tank can flow. The openings 12 of the alternate plates 8 are at opposite sides of the tank, as shown in Fig. 3, so that the liquid will have to travel back and forth across the tank in its passage therethrough.

When the tank is to be used in connection with an electric current of a certain potential, say, for example, 110 volts, the middle electrode, 4, is used, as illustrated. In this event the liquid to be treated, such as a salt solution, may be inserted in the tank at the middle portion thereof, through the openings 13, 14, and will flow in both directions therefrom toward both ends of the tank, and may be withdrawn through the openings 15. The openings 15 are preferably located above the top of the plates 8 and 9, so that said plates are always covered by the liquid in the tank. When the liquid is inserted through the openings 13 and 14, it flows in both directions from the center and passes through the openings 12 in the plates 9, and passes over the top of the plates 8 until it reaches the ends of the tank, whereupon it is withdrawn through the openings 15.

I claim:

An electrolytic apparatus comprising a tank, an electrode near the middle thereof, an electrode near each end thereof, said latter electrodes of opposite polarity from the former electrode, a series of plates extending across the tank and located between the electrode near the center of the tank and the electrodes at the ends thereof, said plates extending entirely across the tank and from the bottom about half way up the sides thereof, some of said plates being continuous and the others provided with openings, means for inserting the liquid to be treated into said tank near the middle thereof, discharge openings near the ends of said tank through which the material treated may pass, said discharge openings located above the tops of said plates, and means associated with the plates, having holes therethrough, for preventing the liquid from passing over the tops thereof.

LAURA G. FIXEN.

Witnesses:
EDWARD NIXON,
WILLIAM H. CONE.